United States Patent
Hasenour et al.

(10) Patent No.: US 7,642,472 B2
(45) Date of Patent: Jan. 5, 2010

(54) SWITCH PACKAGE ASSEMBLY WITH MOUNTING BASE ADAPTER

(75) Inventors: Timothy Hasenour, Clemmons, NC (US); Randy Hannah, Kernersville, NC (US); Kurt T. Zarbock, Advance, NC (US)

(73) Assignee: Tyco Electronics Corporation, Middletown, PA (US)

( * ) Notice: Subject to any disclaimer, the term of this patent is extended or adjusted under 35 U.S.C. 154(b) by 587 days.

(21) Appl. No.: 11/103,237

(22) Filed: Apr. 11, 2005

(65) Prior Publication Data

US 2006/0237616 A1   Oct. 26, 2006

(51) Int. Cl.
*H01R 13/46* (2006.01)

(52) U.S. Cl. .......... 174/520; 174/535; 174/563; 174/53; 248/346.06; 200/50.02

(58) Field of Classification Search .......... 174/520, 174/50, 53, 57, 58, 480, 481, 521, 535, 563; 248/906, 346.06, 346.01; 439/527, 535, 439/536; 200/50.01, 50.02
See application file for complete search history.

(56) References Cited

U.S. PATENT DOCUMENTS

| | | | | |
|---|---|---|---|---|
| 1,992,059 A * | 2/1935 | Despard | ........ | 174/53 |
| 2,248,201 A * | 7/1941 | Russell et al. | ........ | 174/53 |
| 3,335,248 A * | 8/1967 | Bassani | ........ | 174/53 |
| 3,562,468 A * | 2/1971 | Stefani | ........ | 174/53 |
| 5,457,286 A * | 10/1995 | Flasz | ........ | 439/536 |
| 6,937,461 B1 * | 8/2005 | Donahue, IV | ........ | 174/50 |
| 7,211,727 B2 * | 5/2007 | Pearse et al. | ........ | 174/53 |
| 7,273,392 B2 * | 9/2007 | Fields | ........ | 174/53 |

OTHER PUBLICATIONS

Curtis Electronic-Electrical Terminal Blocks And Relay Sockets, Catalog No. 1187-6, pp. 39-41.

* cited by examiner

*Primary Examiner*—Angel R Estrada

(57) ABSTRACT

A mounting base for switch packages having a mounting flange is provided. The base includes a body having a first receptacle and a second receptacle, and each of the first and second receptacle is configured to accept a mounting flange of the switch package with snap-fit engagement. The first and the second receptacles are inverted relative to one another and allow mounting of the switch package with a fewer number of fasteners.

20 Claims, 5 Drawing Sheets

SWITCH PACKAGE ASSEMBLY WITH MOUNTING BASE ADAPTER

BACKGROUND OF THE INVENTION

This invention relates generally to electrical switching packages, and more particularly, to a mounting base for electrical switching packages.

Electrical switching packages are known, and include for example, relay switch packages which open or close circuit paths to complete or break electrical circuits in an electrical system. Such relay switch packages are commercially available from, for example, Tyco Electronics Corporation of Harrisburg, Pa. Typically, such switch packages include nonconductive housings having mounting flanges formed thereon, and using known fasteners such as screws, the packages may be mounted to another device via the mounting flange and the fasteners. Usually, two screws are employed in each mounting flange to mount the switch package for use.

Many electrical systems, however, include more than one of such switch packages, and individually mounting multiple switch packages can be time consuming and difficult. Preformed mounting tracks are available to simplify mounting of some switch packages that may be mounted to a panel and accommodate switch packages with snap-fit engagement, thereby reducing the number of fasteners required to mount the packages Such mounting tracks, however, are generally standardized and accommodate switch packages of certain widths, shapes, and cross-sections. Consequently, not all switch packages are compatible with known mounting tracks, including, for example, the T9A relay package of Tyco Electronics Corporation. Additionally, the mounting tracks can be cost prohibitive in certain applications, and also tend to occupy a large area, sometimes referred to as a footprint, on the installation site.

It would be desirable to provide a lower cost solution for mounting of switch packages which would reduce installation time and minimize the footprint of the switch packages in the field.

BRIEF DESCRIPTION OF THE INVENTION

According to an exemplary embodiment, a mounting base for switch packages having a mounting flange is provided. The base comprises a body comprising a first receptacle and a second receptacle, and each of the first and second receptacle is configured to accept a mounting flange of the switch package with snap-fit engagement. The first and the second receptacles are inverted relative to one another.

Optionally, each of the first receptacle and the second receptacle comprise a single mounting fastener opening, and the fastener openings oppositely situated from one another in the base. Each of the first and second receptacles may comprise a pair of resilient arms contacting an edge of the mounting flange of the switch package when installed to the base. The receptacles may be configured to retain the mounting flanges of the switch packages to the mounting base, and the receptacles are configured to provide mounting of the switch packages using diagonally located fasteners engaging the mounting flanges.

According to another exemplary embodiment, a switch package assembly comprises at least a first switch package and a second switch package. Each of the first and second switch packages having a mounting flange with a number of mounting fastener openings therethrough, and a mounting base is provided comprising a body comprising a first receptacle and a second receptacle each configured to accept the respective mounting flanges of the first and second switch packages with snap-fit engagement. The first and second receptacles are arranged inversely to one another, and at least some of the mounting fastener openings are inaccessible when the switch packages are engaged to the mounting base.

DETAILED DESCRIPTION OF THE INVENTION

Figure 1:
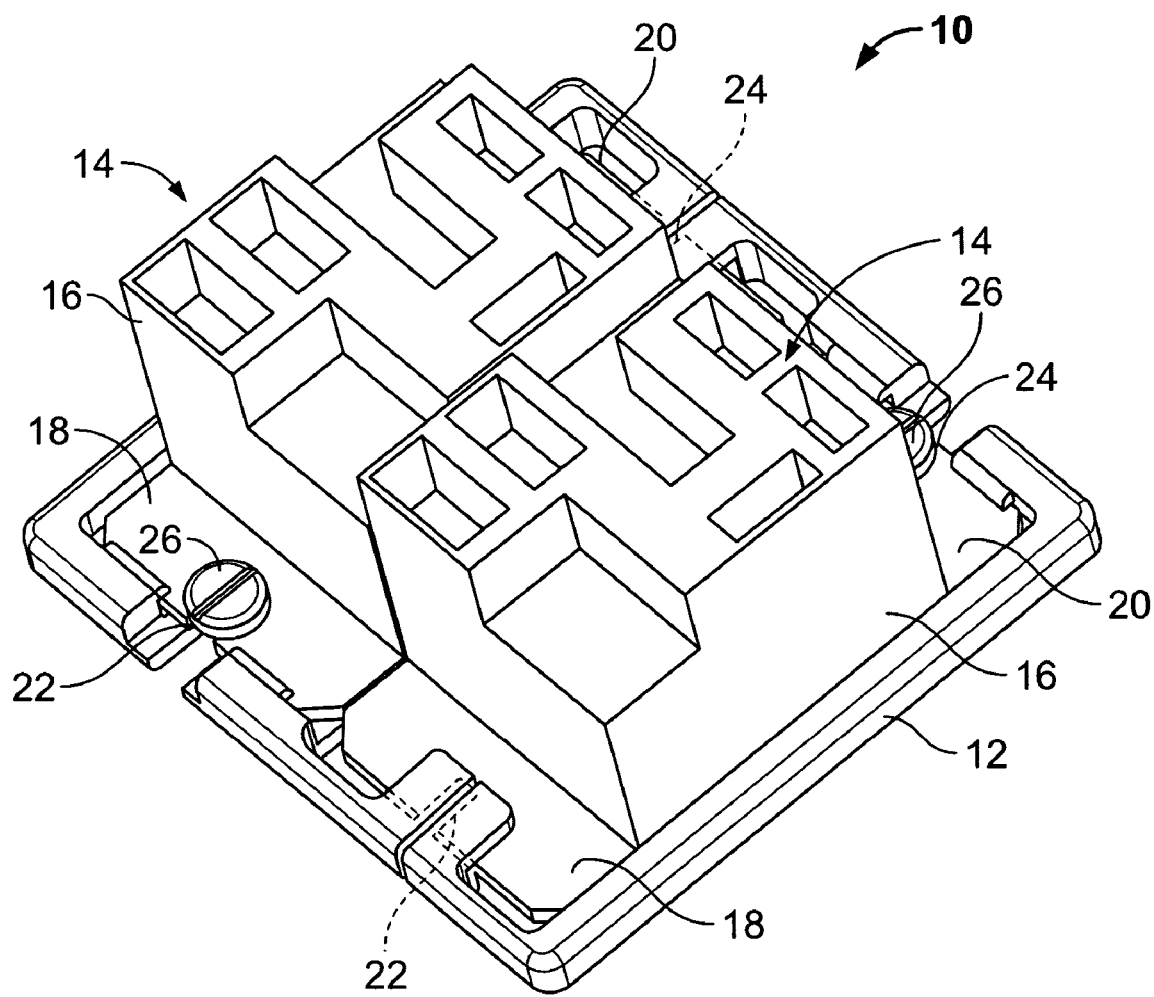
FIG. 1 is a perspective view of a switch package assembly formed in accordance with an exemplary embodiment of the present invention.

FIG. 1 is a perspective view of a switch package assembly 10 including a mounting base 12 and a pair of switch packages 14 coupled in accordance with an exemplary embodiment of the present invention. As explained below, the switch package assembly 10 reliably secures at least two switch packages 14 to the mounting base 12 and reduces the number of fasteners required, and while reducing the footprint size.

In an exemplary embodiment, the mounting base 12 is configured to simultaneously couple a pair of switch packages 14, although, as explained below, only one switch package 14 may be mounted to the base 12 at any given time, while the second switch package 14 may be mounted at a later time. In alternative embodiments, the mounting base 12 may be configured to simultaneously couple n number of switch packages (e.g., three or more switch packages 14), although less than the entire number n of switch packages 14 could be accommodated by the base 12 at any given point in time. In one embodiment, the switch packages 14 are T9A relay switch packages that are commercially available from Tyco Electronics Corporation of Harrisburg, Pa. While the invention is described and illustrated in the context of mounting relay switch packages, it is recognized that the benefits of the invention may accrue to other switch packages as well. The embodiment set forth herein are therefore provided for illustrative purposes only and is but one potential application of the invention.

Each of the switch packages 14 includes a non-conductive housing 16 having a first mounting flange 18 and a second mounting flange 20 formed thereon. The first mounting flange 18 includes a mounting slot 22 and the second mounting flange 20 includes a mounting slot 24 formed therein. The mounting flanges 18 and 20, in cooperation with the mounting base 12, are configured to couple switch package assembly 10 to another device (not shown) via screw fasteners 26.

Figure 2:
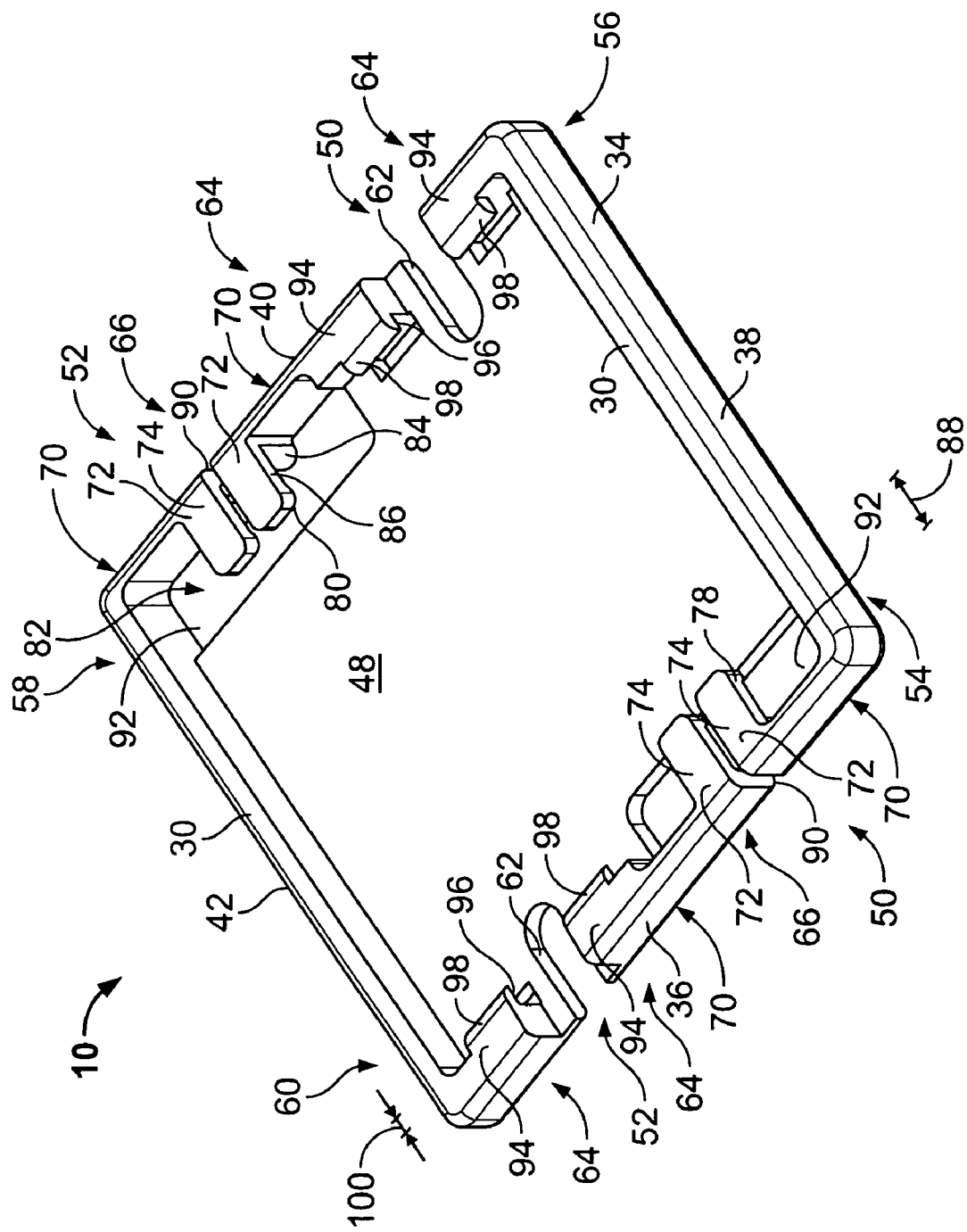
FIG. 2 is a top perspective view of a mounting base for the assembly shown in FIG. 1.
Figure 3:
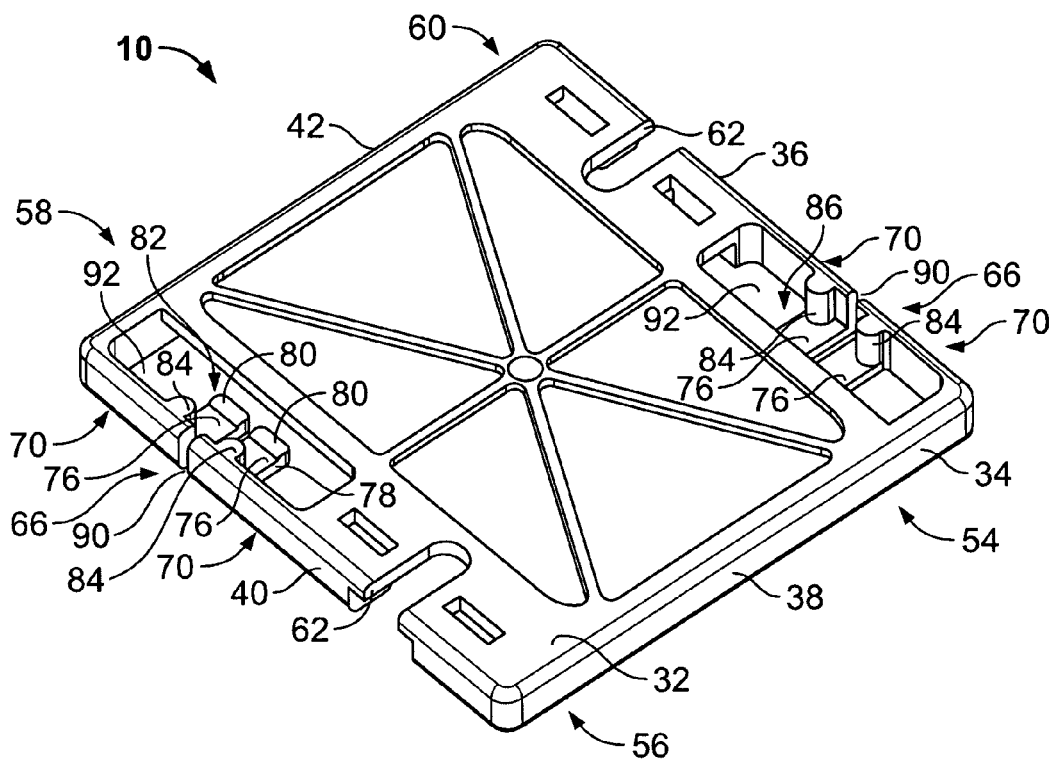
FIG. 3 is a bottom perspective view of the mounting base shown in FIG. 2.

FIG. 2 is a top perspective view of the mounting base 12. FIG. 3 is a bottom perspective view of the mounting base 12. In the exemplary embodiment, the mounting base 12 is rectangular in shape. In alternative embodiments, the mounting base 12 may have any other shape. In an exemplary embodiment, the mounting base 12 is fabricated from a non-conductive material such as nylon according to a known process.

The mounting base 12 includes a top surface 30, a bottom surface 32, and a plurality of sides 34 extending therebetween. Specifically, the mounting base 12 includes a first sidewall 36, a second sidewall 38, a third sidewall 40, and a fourth sidewall 42. The first and third sidewalls 36 and 40 are substantially parallel to one another, and the second and fourth sidewalls 38 and 42 are substantially parallel to one another. As such, the first and third sidewalls 36 and 40 are substantially perpendicular to the second and fourth sidewalls 38 and 42. The sidewalls 36 and 40 have a first length, and the sidewalls 38 and 42 have a second length different from than first length. In an alternative embodiment, however, it is understood that the first and second lengths of the sidewalls may be equal. Top surface 30 further includes an intermediate surface 48 extending between sidewalls 34.

The mounting base 12 includes a first receptacle 50 and a second receptacle 52. The receptacle 50 is positioned adjacent the sidewall 38 and the receptacle 52 is positioned adjacent the sidewall 42. As such, receptacles 50 and 52 are adjacent one another. The receptacle 50 has a first end 54 and a second end 56 opposite the first end 54 and the receptacle 52 has a first end 58 and a second end 60 opposite the first end 58. The first receptacle first end 54 is adjacent the second receptacle second end 60. Specifically, the first receptacle first end 54 is identical to the second receptacle second end 60 and first receptacle second end 56 is identical to the second receptacle first end 58. As such, receptacles 50 and 52 are inversely arranged to one another. That is, the receptacles are reversed or inverted relative to one another in a head-to-toe arrangement wherein the head of one receptacle 50 lies adjacent the toe of the other receptacle 52.

Each of the receptacles 50 and 52 includes a mounting fastener opening 62, a pair of snap grooves 64, and a pair of retaining arms 66. The openings 62 and the snap grooves 64 are co-located at each receptacle second end 56 and the retaining arms are positioned at each receptacle first end 54. Each of the openings 62 extends between the intermediate surface 48 and the bottom surface 32 and is configured to receive a fastener 26 (shown in FIG. 1).

Each pair of retaining arms 66 includes two L-shaped spring arms 70 configured to contact a respective mounting flanges 18 and 20 (shown in FIG. 1). In the exemplary embodiment, each spring arm 70 has a retaining member 72 that has a top surface 74, a bottom surface 76, and a plurality of sides 78 extending therebetween. In the exemplary embodiment, the top surface 74 is co-planar with the base mounting top surface 30. Each bottom surface 76 includes a retaining edge 80 positioned at a leading edge 82 and a support member 84 positioned at a base portion 86 adjacent to the sidewalls 36 and 40. Each retaining member 72 extends from the sidewalls 36 and 40 a length 88. A gap 90 is positioned between each spring arm 70 such that each spring arm 70 is both resilient and deflectable. The gap 90 extends inward towards an aperture 92 defined by retaining arms 66, intermediate surface 48, and bottom surface 32.

Each pair of snap grooves 64 includes a top portion 94, a contact portion 96, and a retaining lip 98 extending therebetween. The top portion is co-planar with base mounting top surface 30, whereas the retaining lip 98 is angled downward towards the intermediate surface 48. The retaining lip 98 has a length 100 that extends from contact portion 96 and opposite retaining arm 66, and the retaining lip is configured to accept a respective mounting flange 18 and 20 with snap-fit engagement. Snap groove retaining lip length 100 is different than retaining arm/member length 88. In the exemplary embodiment, length 100 is less than length 88.

Figure 4:
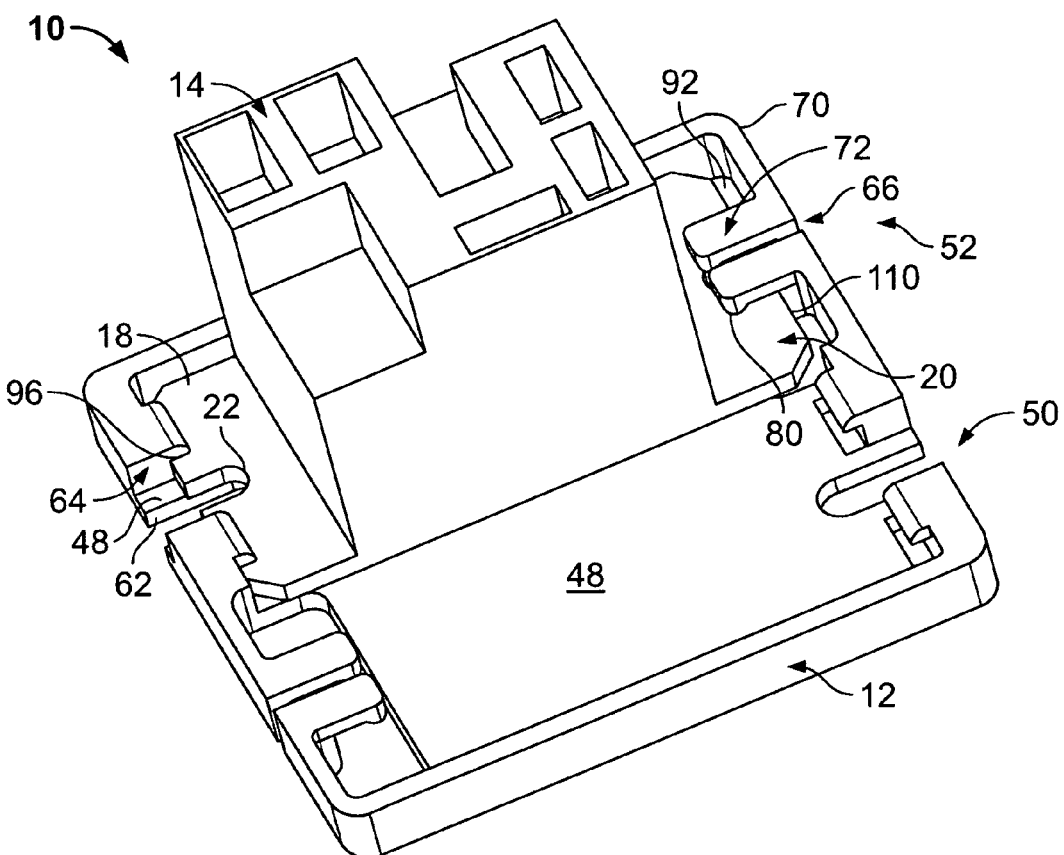
FIG. 4 is a perspective view of the switch package assembly shown in FIG. 1 at a first stage of assembly.

FIG. 4 is a perspective view of the switch package assembly 10 at a first stage of assembly. The switch packages 14 are coupled to the mounting base 12 in a two stage manner. Specifically, the first stage of assembly includes inserting the switch package mounting flange 20 under the deflectable retaining member 72 such that a mounting flange edge 110 is in contact with retaining arm support member 84. The flange 20 is in contact with both of each pair of retaining arms 66. The second stage of assembly includes contacting switch package mounting flange 18 with both snap groove retaining lips 98. Downward pressure is applied to the flange 18 until the flange 18 snaps past the retaining lips 98. As such, flange 18 is held in snap-fit engagement adjacent the snap groove contact portion 96 and the intermediate surface 48. A second switch package 14 may be attached in the same manner.

Figure 5:
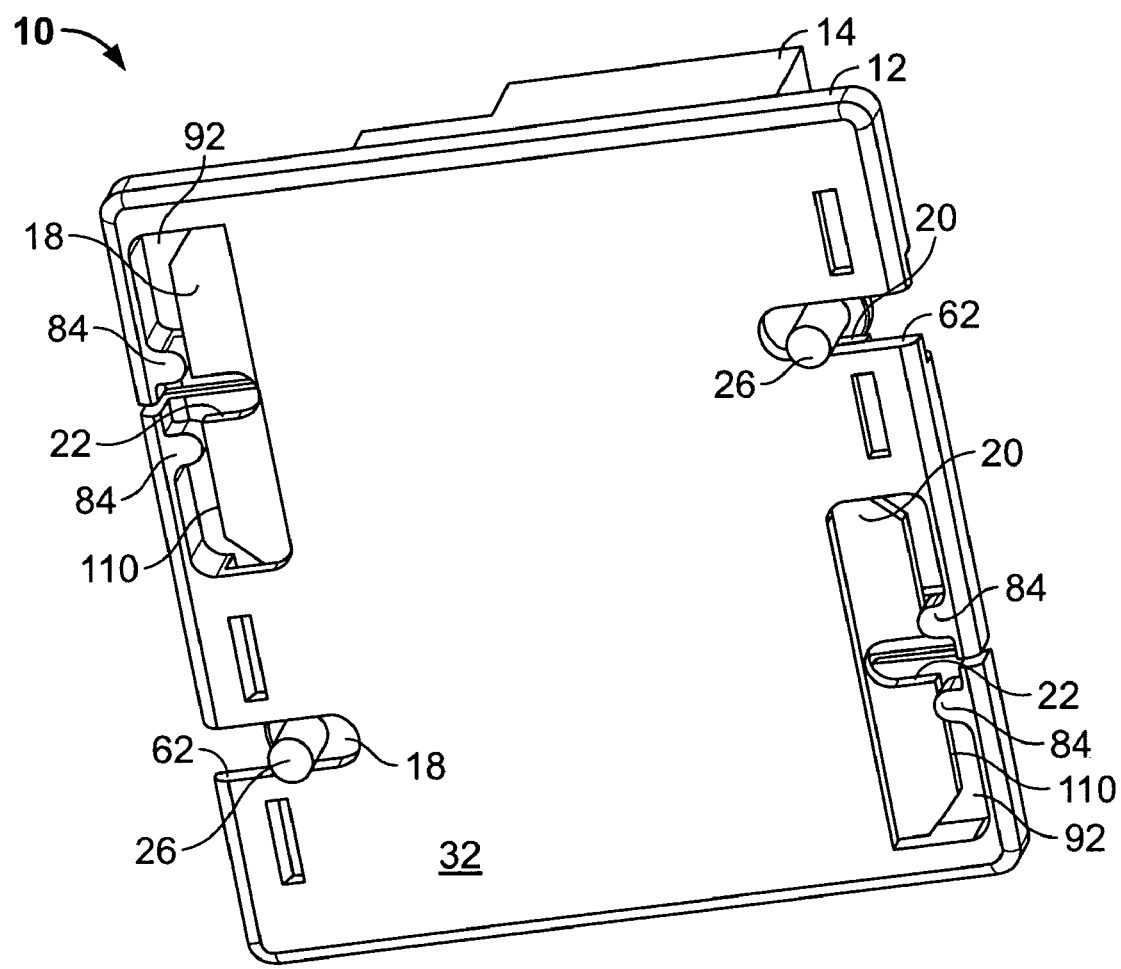
FIG. 5 is a bottom perspective view of the assembly shown in FIG. 1.

FIG. 5 is a bottom perspective view of the switch package assembly 10 at final stage of assembly. The fastener 26 is configured to be inserted through flange mounting slot 22 and mounting base opening 62 and into an awaiting installation site (not shown).

Coupling multiple switch packages 14 to mounting base 12 provides several benefits. Because mounting flanges 18 and 20 are reliably secured in receptacles 50 and 52, multiple switch packages 14 can be coupled to an installation site. Because switch packages 14 are secured with fewer fasteners using the mounting base 12 installation takes less time and is less expensive. As seen in FIG. 1, the switch packages are securely held in the mounting base 12 on side of the mounting base 12 via the retaining arms while simultaneously being mounted to another device or surface (not shown) via the fastening screws 26. Because the receptacles of the mounting base 12 are inverted, the retaining arms and the fastening screws are located diagonally to one another, thereby providing a secure and stable mounting arrangement using half the number of screw fasteners 26 (two instead four in the illustrated embodiment) to mount the switch packages 14. The wiring positions of the switch packages 14 can be aligned with one another or inverted relative to one another to accommodate different wiring options in use.

Using the mounting base 12, a single fastener may be utilized to securely mount each of the respective switch packages in a secure, stable and compact configuration without the use of adhesives or fasteners which in turn allows for quick and easy removal and replacement of switch packages 14. By virtue of the snap action fit of the switch packages 14 and the reduced number of fasteners, the switch packages may be installed in less time with less difficulty, thereby reducing time and cost associated with mounting the switches. Furthermore, the switch packages 14 can be pre-wired, pre-tested, and mounted to a wiring harness prior to connection to the mounting base 12, which is advantageous when access to the ultimate location of the switch packages in an electrical system is limited or restricted.

Additionally, the mounting base 12 holds the switch packages 14 in an abutting side-by-side relationship which minimizes the footprint of the switch packages when mounted at the installation site.

Figure 6:
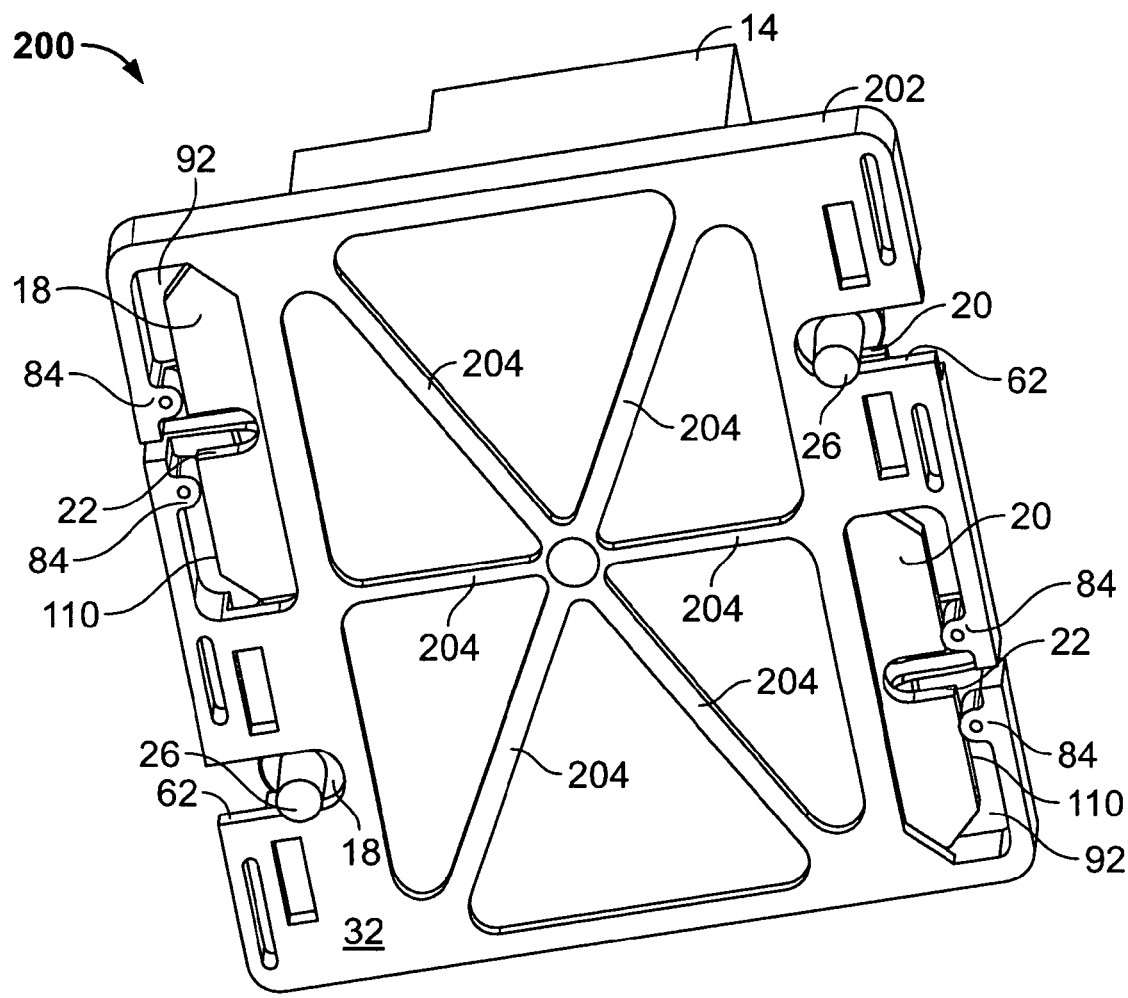
FIG. 6 is a bottom perspective view a switch package assembly similar to FIG. 5 but illustrating another embodiment of the mounting base.

FIG. 6 illustrates another embodiment of a switch package assembly 200 including a mounting base 202 and switch packages 14 mounted thereto, and in which like reference elements of the switch package assembly 10 (described above in relation to FIGS. 1-5) are designated with like reference characters in FIG. 6.

As shown in FIG. 6, the mounting base 202 includes reinforcing ribs 204 formed into a lower surface thereof. The ribs 204 provide structural strength and rigidity to the mounting base 202 to prevent excessive bending and deflection of the mounting base 202 as switch packages are installed to and removed from the mounting base 202 with snap-fit engagement as described above. The ribs 204 in an exemplary embodiment are molded features of the mounting base 202, although it is contemplated that they could be separately provided and coupled to the mounting base 202 in other embodiments. Still other reinforcing features could be provided in further and/or alternative embodiments as needed or as desired.

Except for the provision of the reinforcing ribs 204, the mounting base 202 is otherwise constructed similarly to the mounting base 12 described above, and the mounting base 202 consequently provides similar advantages and benefits to the mounting base 12.

While the invention has been described in terms of various specific embodiments, those skilled in the art will recognize that the invention can be practiced with modification within the spirit and scope of the claims.

What is claimed is:

1. A mounting base for switch packages having a mounting flange, said base comprising:
    a body comprising a first receptacle and a second receptacle, each of said first and second receptacle configured to accept a mounting flange of the switch package with snap-fit engagement, said first and said second receptacles being arranged in a head-to-toe configuration relative to one another.

2. A mounting base in accordance with claim 1 wherein each of said first receptacle and said second receptacle comprise a single mounting fastener opening, said fastener openings oppositely situated from one another in said base.

3. A mounting base in accordance with claim 1 wherein each of said first receptacle and second receptacle comprise a mounting fastener opening and a resilient retaining arm, said retaining arm and said fastener opening located on opposite side of the switch package when the switch package is received in the respective one of said first and second receptacles.

4. A mounting base in accordance with claim 1 wherein said first and second receptacles are arranged at least one of inversely and inverted relative to one another.

5. A mounting base in accordance with claim 1 wherein each of said first and second receptacles comprises a resilient arm contacting an edge of the mounting flange of the switch package when installed to said base.

6. A mounting base in accordance with claim 1 wherein each of said first and second receptacles comprises a snap groove on one end and a deflectable spring arm on a second end opposite said snap groove.

7. A mounting base for switch packages having a mounting flange, said base comprising a body comprising a first receptacle and a second receptacle each of which is arranged inversely to one another, said first and second receptacles configured to accept a mounting flange of the switch package with snap-fit engagement, at least one of said first and second receptacles comprising a mounting fastener opening.

8. A mounting base in accordance with claim 7 wherein each of said first receptacle and second receptacle comprise a single mounting fastener opening, whereby the switch package may be mounted with a single fastener engaging the opening.

9. A mounting base in accordance with claim 7 wherein each of said first receptacle and second receptacle comprise one of the mounting fastener opening and each of said first receptacle and second receptacle comprise a resilient retaining arm, said retaining arm and said fastener opening located on opposite sides of the switch package when the switch package is received in the respective one of said first and second receptacles.

10. A mounting base in accordance with claim 7 wherein each of said first and second receptacles comprises a resilient arm contacting an edge of the mounting flange of the switch package when installed to said base.

11. A mounting base in accordance with claim 7 wherein each of said first and second receptacles comprises a snap groove on one end and a deflectable spring arm on a second end opposite said snap groove.

12. A switch package assembly comprising:
    at least a first switch package and a second switch package, each of said first and second switch packages having a mounting flange with a number of mounting fastener openings therethrough; and
    a mounting base comprising a body comprising a first receptacle and a second receptacle each configured to accept the respective mounting flanges of the first and second switch packages with snap-fit engagement, said first and second receptacles arranged inversely to one another, and wherein at least some of said mounting fastener openings are inaccessible when the switch packages are engaged to said mounting base.

13. A switch package assembly in accordance with claim 12 wherein said first receptacle and second receptacle comprise a single mounting fastener opening, said fastener openings oppositely situated from one another in each of said first and second receptacles.

14. A switch package assembly in accordance with claim 12 wherein each of said first receptacle and second receptacle comprise a mounting fastener opening and a resilient retaining arm, said retaining arm and said fastener opening located on opposite side of the respective switch package when the first and second switch packages are received in the respective one of said first and second receptacles.

15. A switch package assembly accordance with claim 12 wherein said first and second receptacles are arranged in a head-to-toe configuration.

16. A switch package assembly in accordance with claim 12 wherein each of said first and second receptacles comprises a resilient arm contacting an edge of the respective mounting flange of the first and second switch packages when installed to said base.

17. A switch package assembly in accordance with claim 12 wherein each of said first and second receptacles comprises a snap groove on one end and a deflectable spring arm on a second end opposite said snap groove.

18. A switch package assembly in accordance with claim 12 wherein said first and second receptacles are configured to retain the mounting flanges of the switch packages to the mounting base, and the receptacles are configured to provide mounting of the switch packages using diagonally located fasteners engaging the mounting flanges.

19. A mounting base for switch packages having a mounting flange, said base comprising:
    a body comprising a first receptacle and a second receptacle, wherein the first and second receptacles are configured to provide mounting of the switch packages using diagonally located fasteners engaging the mounting flanges, the fasteners being discrete components from the body.

20. A switch package assembly comprising:
    at least a first switch package and a second switch package, each of said first and second switch packages having a mounting flange with a number of mounting fastener openings therethrough; and a mounting base comprising a body comprising a first receptacle and a second receptacle each configured to accept the respective mounting flanges of the first and second switch packages with snap-fit engagement, wherein said first receptacle and second receptacle each comprise at least one mounting fastener opening, the at least one mounting fastener opening of said first receptacle numbering less than the number of the mounting fastener openings in the first switch package, the at least one mounting fastener opening of said second receptacle numbering less than the number of the mounting fasteners openings in the second switch package.

* * * * *